United States Patent Office 3,725,216
Patented Apr. 3, 1973

3,725,216
PLASTIC MOLDING COMPOSITION AND
METHOD OF PREPARATION
Michael Ladney, Jr., Grosse Pointe Shores, Mich.
(18125 E. Ten Mile Road, East Detroit, Mich. 48021)
No Drawing. Filed Sept. 27, 1971, Ser. No. 184,214
Int. Cl. C23b 5/62
U.S. Cl. 204—30   1 Claim

ABSTRACT OF THE DISCLOSURE

ABS plastic molding pellets containing a small amount of iso-octly stearate which imparts to the molded part the ability to provide an excellent bond for an electrolytically deposited metal plating.

---

The invention relates to a plastic molding composition and a method of preparing the same.

More specifically, the invention relates to an ABS (acrylonitrile - butadiene - styrene co-polymer) molding composition admirably suited for molding parts which are to be plated by electrolytic deposition.

Parts molded from plastic are electrically nonconductive as molded and are thus subjected to various standard chemical treatments for the purpose of applying a thin metallic coating thereon to adapt the parts for plating by conventional methods of electrolytic deposition. In the case of parts molded from ABS, the molded plastic surface is normally subjected to a preplating treatment consisting of dipping the part in a chromic acid—sulfuric acid solution which will normally oxidize or selectively etch the plastic surface and create bonding sites for the subsequent electrolytic deposition. Following this oxidizing etch the molded part is normally subjected to a sensitizing solution which normally results in the deposition of a catalytic material, such as palladium, on the surface of the part. The palladium catalyzes the deposition of a thin conductive film normally of either copper or nickel from solution. This conductive film enables a variety of metals to be electrolytically deposited on the surface of the ABS molded part.

The mechanism of bonding metal coatings to plastic molded parts by electrolytic deposition has been explained by either the mechanical locking of the metal coating on the surface of the plastic part, by a chemical bonding of the metal to the plastic surface, or by a combination of these two factors. Regardless of which theory is most accurate, numerous tests have shown that the adhesion or bond between the metal coating and the plastic surface is enhanced when the plastic part is molded in a stress-free condition.

The production of stress-free molded plastic parts is effected by numerous factors such as the selection of plastic molding material, the design of the part, and the selection of proper molding conditions and techniques. I have found, for example, that in plating parts molded from ABS plastic the ability to obtain good uniform adhesion between the plating and the part is affected to a large extent by the viscosity of the resin. The less viscous ABS resins tend to produce less stress in the molded part; while the higher viscous resins have a tendency to produce highly stressed parts. The stress-free parts promote a much stronger bond between the plating and the plastic surface than do the highly stressed parts.

The object of this invention is to produce an inexpensive ABS plastic molding material of a good platable grade.

More specifically, it is an object of this invention to convert the less expensive, highly viscous ABS resins to a low viscosity, platable grade resin by the small addition of iso-octyl stearate to the resin.

Numerous tests made in connection with the present invention show that the incorporation of a small amount of iso-octyl stearate in the highly viscous ABS molding resins lowers the viscosity of the resin so that it flows very freely into the mold cavity at normal molding temperatures and pressures. However, when the modified ABS resin sets, the additive not only restores the desirable properties of the highly viscous ABS resins (that is, toughness and rigidity) but also enhances the ability of the plating to adhere to the surface of the plastic molded part.

In practicing the present invention I have found it most expedient to first thoroughly mix given proportions of iso-octyl stearate with ABS resin in powder form to form a master batch. Thereafter a small amount of the master batch is mixed thoroughly with a substantial amount of ABS in pellet form. This facilitates and greatly simplifies extruding the mixture into molding granules, even though the master batch mixture (because of the nature of the iso-octyl stearate) is in and of itself a wet, slippery, smooth mass which is not readily extrudable.

The following is typical of the procedure utilized according to the present invention: A master batch is prepared by thoroughly mixing in a high speed mixer 16.7% iso-octyl stearate and 83.3% ABS powder. After the iso-octyl stearate is uniformly blended into the powder the master batch is mixed with ABS pellets of molding grade in the ratio of about 6% of the master batch and 94% of the ABS pellets. After thorough mixing, the mixture is extruded into pellets suitable for molding in conventional extruding apparatus. The final pellets, containing about 1% iso-octyl stearate, are admirably suited for molding parts which are to be subsequently plated by electrodeposition. The iso-octyl stearate, in an amount of about 1% in the final molding pellet, imparts high flow characteristics to the resin during injection molding and produces a molded part which is characterized by its ease of platability and excellent impact and flexural strength.

The proportions given are by weight and can be varied within limits without substantially affecting the desirable characteristics of the final product. For example, I have found that the improved results are obtained when the final ABS molding pellets contained from about .7 to 1.5% of iso-octyl stearate. Likewise the proportions of the master batch mixed with the ABS pellets for final extruding can vary from about 2% to 10%, the composition of the master batch being modified, however, so that the final molding pellets will contain about .7% to 1.5% of iso-octyl stearate.

Although I am unable to explain with certainty the scientific reasons why the small addition of iso-octyl stearate in ABS pellets produces a substantial improvement in the platability of the molding parts, I believe that the additive produces stress-free parts by allowing the ABS molecules to freely assume positions during molding which results in a more homogeneous mass or structure. It also enables the preplating etch to penetrate and oxidize the surface of the molded part very uniformly. It is also possible that the additive promotes adhesion of the metal plating to the oxidized plastic surface by way of covalent bonding. However, irrespective of the actual chemical or mechanical action which takes place, the electrolytically deposited plating adheres very firmly to the molded parts and an excellently plated part is produced in a most economical manner.

I claim:

1. The method of producing an electroplated plastic part which comprises, molding the part from a molding material consisting essentially of about .7 to 1.5% of iso-octyl stearate and the remainder of ABS plastic, oxidizing the surface to etch the same, treating the part with a sensitizing solution adapted to accelerate chemical deposition of a metal layer thereon, depositing by chemical reaction a layer of metal on the sensitized surface so as to render the part electrically conductive and thereafter applying to the part a metal plating thereon by electrolytic deposition.

References Cited

UNITED STATES PATENTS

| | | | |
|---|---|---|---|
| 2,939,852 | 6/1960 | Schmidle | 260—880 R |
| 3,029,223 | 4/1962 | Hibbard | 260—880 R |
| 3,579,612 | 5/1971 | Lowell | 260—880 R |
| 3,607,983 | 9/1971 | Rushton | 260—880 R |
| 3,622,370 | 11/1971 | D'Ottavio | 204—30 X |
| 3,661,538 | 5/1972 | Brown et al. | 204—30 |

FREDRICK C. EDMUNDSON, Primary Examiner

U.S. Cl. X.R.

260—880 R